United States Patent
Chen et al.

(10) Patent No.: US 7,174,736 B2
(45) Date of Patent: Feb. 13, 2007

(54) LOW-TEMPERATURE DELIVERY VEHICLE

(75) Inventors: I-Hsiung Chen, Taichung (TW); Ying-Chien Jang, Taichung (TW); Ming Chang Hu, Taichung (TW)

(73) Assignee: T.Join Transporation Co., Ltd., Taichung (TW)

( * ) Notice: Subject to any disclaimer, the term of this patent is extended or adjusted under 35 U.S.C. 154(b) by 128 days.

(21) Appl. No.: 11/022,643

(22) Filed: Dec. 28, 2004

(65) Prior Publication Data

US 2006/0137374 A1 Jun. 29, 2006

(51) Int. Cl.
*B60H 1/32* (2006.01)

(52) U.S. Cl. .......................................... 62/239; 62/529

(58) Field of Classification Search .......... 62/239–244, 62/246–256, 529–530
See application file for complete search history.

(56) References Cited

U.S. PATENT DOCUMENTS

| | | | | |
|---|---|---|---|---|
| 1,511,453 A | * | 10/1924 | Folger | 62/417 |
| 3,906,744 A | * | 9/1975 | Knapp et al. | 62/384 |
| 4,103,510 A | * | 8/1978 | Hall | 62/299 |
| 4,637,222 A | * | 1/1987 | Fujiwara et al. | 62/244 |
| 4,748,823 A | * | 6/1988 | Asano et al. | 62/239 |
| 4,802,342 A | * | 2/1989 | Gustafson et al. | 62/239 |
| 6,415,623 B1 | * | 7/2002 | Jennings et al. | 62/457.2 |
| 6,467,293 B1 | * | 10/2002 | Goosman | 62/239 |

* cited by examiner

Primary Examiner—William E. Tapolcai
(74) Attorney, Agent, or Firm—Browdy and Neimark, PLLC

(57) ABSTRACT

A method of enhancing a freezing capacity of a low-temperature delivery vehicle is that cool cold devices by a freezing machine, each of which has an eutectic material therein, to a temperature lower than eutectic temperatures of the cold devices, and then put the cold devices in a chamber of a vehicle, which the vehicle has a refrigerator to provide a cold airflow to the chamber via an outlet on a wall of the chamber. The cold devices have to be taken out after a predetermined period and cooled again to recycle. The low-temperature delivery vehicle of the present invention has a van body having a chamber therein, a refrigerator having an outlet on a wall of the chamber to provide a cold airflow to the chamber, and a plurality of cold devices in the chamber of the van body.

13 Claims, 3 Drawing Sheets

LOW-TEMPERATURE DELIVERY VEHICLE

BACKGROUND OF THE INVENTION

1. Field of the Invention

The present invention relates generally to a low-temperature delivery system, and more particularly to a low-temperature delivery vehicle and the method of enhancing the freezing capacity thereof.

2. Description of the Related Art

Low temperature delivery trucks are the common equipment used in the low temperature delivery system to transport foods, medicine, chemical goods and so on. The conventional low temperature delivery truck has a container. The container is provided with an isolating layer on a wall thereof to form a chamber therein, such that it keeps the goods stored therein in a well condition. Some trucks are equipped with a refrigerator to provide the chamber in a low-temperature environment. Some refrigerators have an independent power and others are connected to the engine of the truck. Other truck is provided with no refrigerator but with cold blocks mounted on/in the wall of the chamber. The truck equipped with the refrigerator provides the chamber in a lower temperature for a longer time than that of the truck without the refrigerator. As a result, the truck equipped with the refrigerator is broadly used in long distance transportation or the goods having to be stored in a lower temperature environment.

The temperatures for storing various goods have to meet the properties of the goods. For example, milks are preferred to be stored in an environment about 4° C. and ice creams are preferred to be stored in an environment about −20° C. It is easy to understand that the truck has to be equipped with the refrigerator with greater power while the goods stored in the truck have to be stored in an ultra-freezing environment. But such refrigerator is much heavier and takes much space than the normal refrigerator, so that the cost is much higher to transport the goods, such as ice cream, which have to be stored in an ultra-freezing environment.

SUMMARY OF THE INVENTION

The primary objective of the present invention is to provide a low-temperature delivery vehicle, which can enhance the freezing capacity without having to increase the power of the refrigerator.

According to the objective of the present invention, a method of enhancing a freezing capacity of a low-temperature delivery vehicle is that cool a plurality of cold devices by a freezing machine, each of which has an eutectic material therein, to a temperature lower than eutectic temperatures of the eutectic materials of the cold devices, and then put the cold devices in a chamber of a vehicle, which the vehicle has a refrigerator to provide a cold airflow to the chamber via an outlet on a wall of the chamber. The cold devices have to be taken out after a predetermined period and frozen again to be reused.

The low-temperature delivery vehicle of the present invention has a van body having a chamber therein, a refrigerator having an outlet on a wall of the chamber to provide a cold airflow to the chamber, and a plurality of cold devices in the chamber of the van body at positions of paths of the cold airflow.

DETAILED DESCRIPTION OF THE INVENTION

Figure 1:
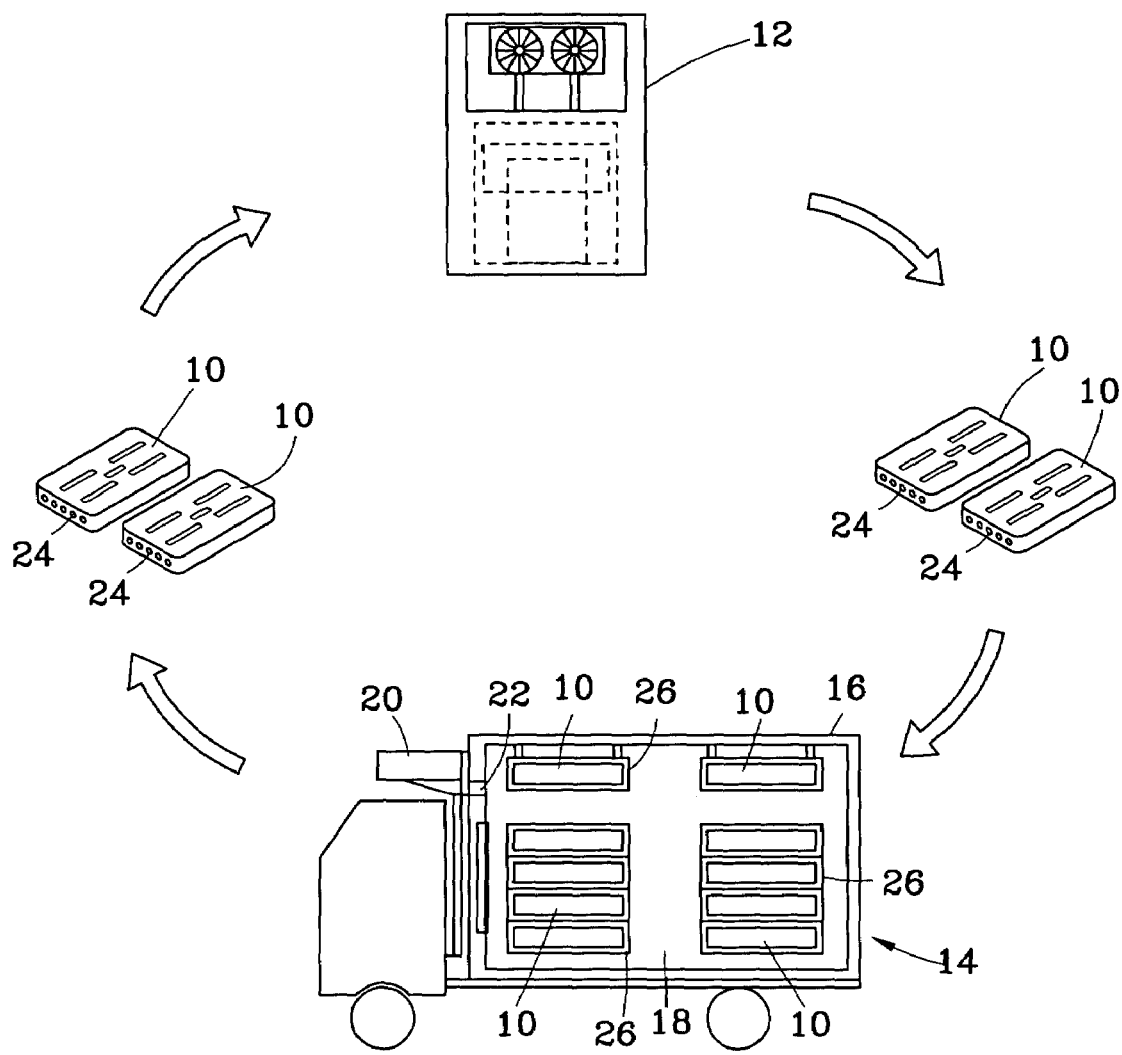
FIG. 1 is a sectional view of a flow chart of a preferred embodiment of the present invention.
Figure 2:
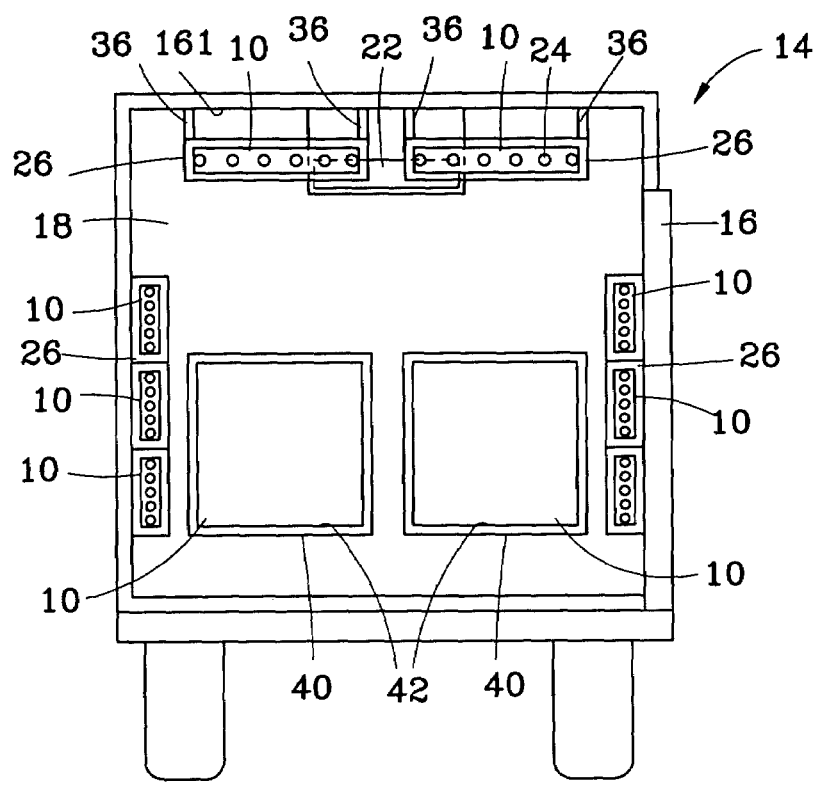
FIG. 2 is a rear view of the low-temperature delivery vehicle of the preferred embodiment of the present invention.

As shown in FIG. 1, the method of enhancing the freezing capacity of a low-temperature delivery vehicle 14 is that put a plurality of cold devices 10 in a freezing machine 12, and then shifts the cold devices 10 to the vehicle 14 from the freezing machine 12. The low-temperature delivery vehicle 14 has a van body 16 with a chamber 18 therein and a refrigerator 20 to provide a cold airflow to the chamber 18 via an outlet 22 on a wall of the chamber 18.

The cold devices 10 have eutectic materials (not shown) therein. The freezing machine 12 freezes the cold devices 10 to a predetermined temperature lower than a eutectic temperature of the eutectic material to transform the eutectic materials from liquid to solid. The frozen cold devices 10 release the latent heat while they are mounted in the chamber 18 of the vehicle 14, such that the temperature in the chamber 18 drops faster and reaches a temperature much lower than the refrigerator 20 could provide and the time of refrigeration. The cold devices 10 have through holes 24 for the cold airflow flowing therethrough that increase the area for thermal exchange. The temperature of the chamber 18 is adjustable via put the cold devices 10 with various eutectic temperature and the quantity of the cold devices 10 mounted in the chamber 18 affects the temperature also.

The cold devices 10 release the latent heat to enhance the freezing capacity of the refrigerator 20 to put the chamber in an ultra-freezing environment. After a time, the cold devices 10 have to be taken out of the chamber 18 and put in the freezing machine 12 again. The cold devices 10 are recyclable for low-temperature transportation.

The vehicle 14 is provided with a plurality of mounts 26 on the wall of the chamber 18, including a top wall 161, a front wall 162 and two lateral walls 163, in which the cold devices 10 are received. The mount 26 is a frame with openings 28 and a door 30 for accessing the cold device 10. A rope 32 has an end fastened on the door 30 and a hook 34 is fastened on a distal end of the rope 32. The hook 34 is adapted to hook the cold device 10 received in the mount 26, such that the rope 32 draws the cold device 10 out of the mount 26 when operator opens the door 30. In the view of increasing the efficiency of thermal exchange, the mount 26 should expose the cold device 10 received therein as possible but it still has to keep an sufficient mechanical strength for the cold device 10.

The cold devices 10 are preferred mounted at positions adjacent to the outlet 22 or on the paths of the cold airflow that increase the efficiency of thermal exchange. The mounts 26 on the top wall 161 have a plurality of legs 36 to fix the mounts 26 on the wall 161. The mounts 26 are kept a predetermined distance from the wall 161 that cold devices 10 received in the mounts 26 have more surfaces for thermal exchange.

The cold devices 10 also could be placed at positions of the cold airflow hard to flow thereto, such as corners of the chamber 18, which could provide the chamber 18 with a uniform distribution of temperature.

Figures 3, 4:
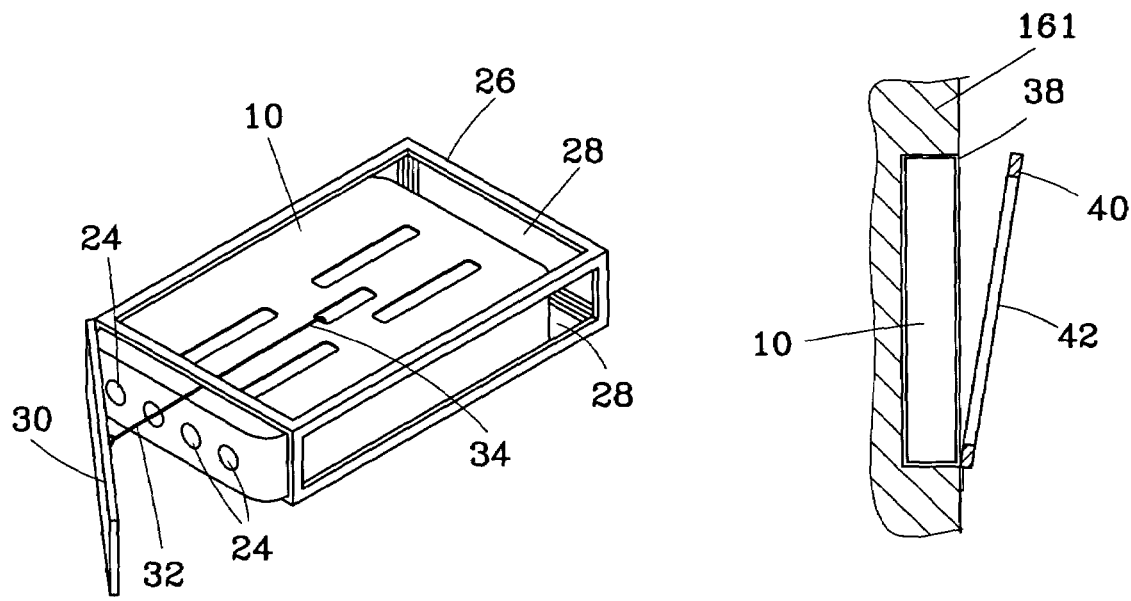
FIG. 3 is perspective view of the cold device and the mount to store the cold device therein.
FIG. 4 is a sectional view of the wall of the low-temperature delivery vehicle of the preferred embodiment of the present invention, showing the fist and second chambers in the isolating condition.

FIG. 4 shows the cold device 10 installed in the front wall 162 of the chamber 18. The front wall 162 has two slots 38, which sizes just meet the cold devices 10 respectively, and two doors 40 for the slots 38. The door 40 has an opening 42, which size is smaller than that of the cold device 10. The door 40 closes the slot 38 and the cold device 10 still performs thermal exchange via the opening 42.

Figure 5:
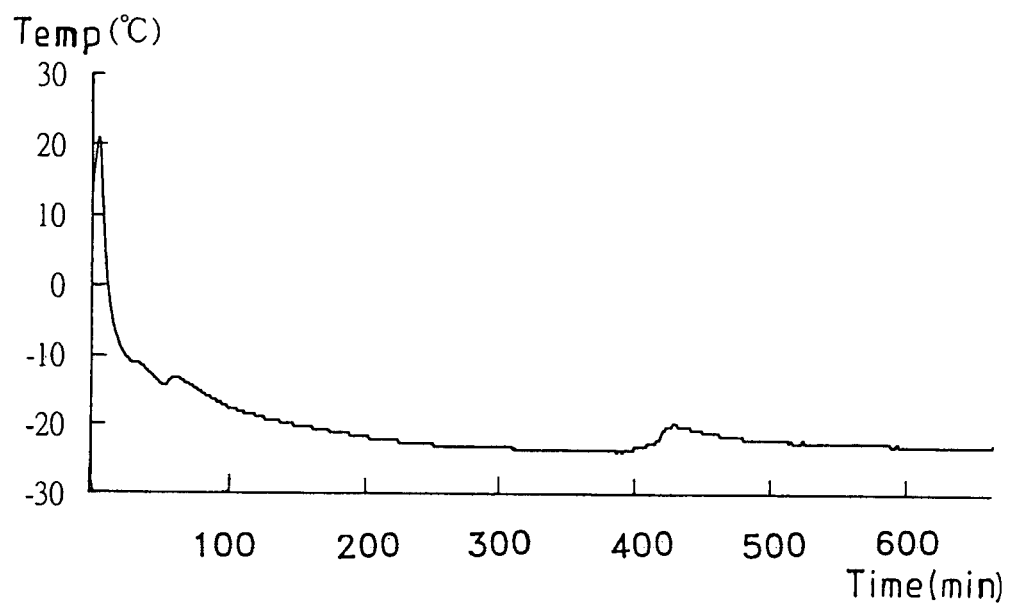
FIG. 5 is a diagram of the temperature change of the chamber of the low-temperature delivery vehicle while the cold devices are mounted in the chamber.

The inventor takes a test to identify the performance of the present invention. The equipments and the parameters are listed hereunder: volume of the chamber: 6,433,650 cm$^3$; power of the refrigerator: 1285 Watt; eutectic temperature of the eutectic material in the cold device: −28° C. The cold devices are mounted in the chamber and the temperature in the chamber is recorded. The temperature change is shown in the diagram of FIG. 5, which shows the ratio of the temperature dropping within the first thirty minutes is 1.05° C./min; the temperature drops to −20° C. at the 149$^{th}$ minutes and keep the temperature under −23° C. over 10 hours.

Figure 6:
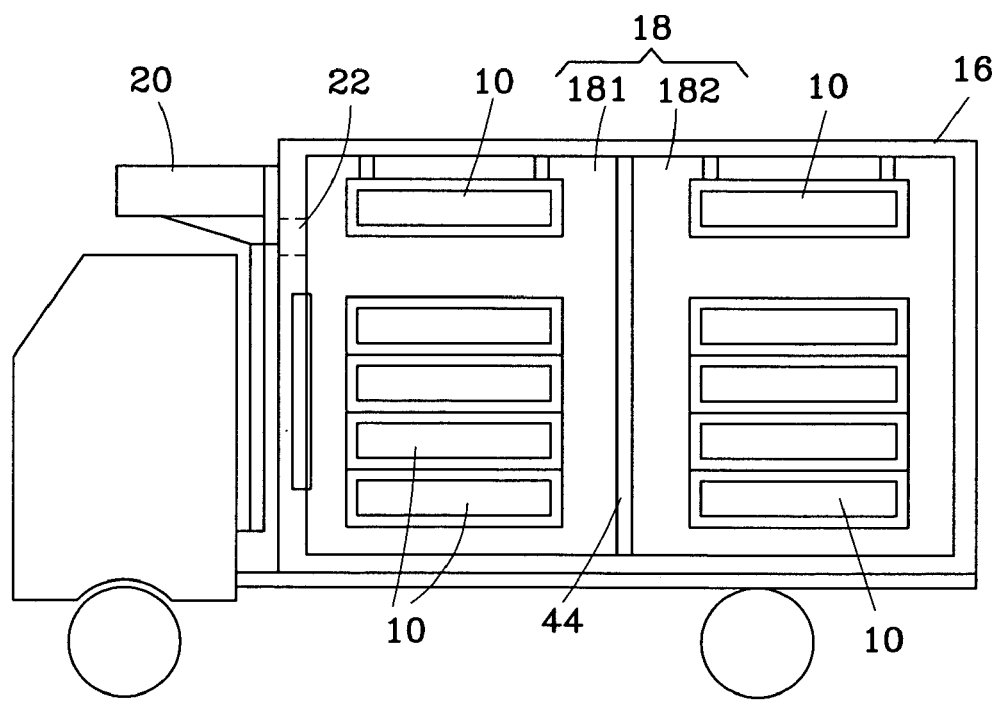
FIG. 6 is a sectional view of the low-temperature delivery vehicle of the preferred embodiment of the present invention.

As shown in FIG. 6, the vehicle 14 is provided with a wall 44 in the chamber 18 to separate the chamber 18 into a first sub-chamber 181 and a second sub-chamber 182. The outlet 22 is in the first sub-chamber 181. The eutectic temperature of the cold devices 10 in the first sub-chamber 181 is greater than the eutectic temperature of the cold devices 10 in the second sub-chamber 182 that make the temperature in the sub-chamber 181 is lower than the temperature in the second sub-chamber 182.

In conclusion, the advantages of the present invention are:

1. With the cold devices and the refrigerator, the speed of temperature drop is faster and reach a temperature beyond the refrigerator can provide.

2. The cold device can make the temperature in the chamber having a uniform distribution. The present invention can improve the efficiency of convection in the chamber to provide less variety of the temperature distribution in the chamber.

3. The present invention can extend the time of refrigerating the goods over twelve hours.

4. The temperature in the chamber can change via access the cold devices with different eutectic temperatures. It also can provide the wall in the chamber of the vehicle to separate the chamber into two sub-chambers and the cold devices in the sub-chambers have different eutectic temperatures, such that the vehicle could get two chambers with two temperatures to store suitable goods respectively.

What is claimed is:

1. A low-temperature delivery vehicle, comprising:
a van body having a chamber therein;
a refrigerator having an outlet on a wall of the chamber to provide a cold airflow to the chamber, and
a plurality of cold devices, each of which has an eutectic material therein and the eutectic material has an eutectic temperature, in the chamber of the van body at positions of paths of the cold airflow;
wherein the cold devices cooled to a temperature lower than the eutectic temperatures of the eutectic materials prior to the cold devices are put in the chamber;
wherein the van body is provided with a plurality of mounts on the wall of the chamber, in which the cold devices are received, and the mounts have openings and a door respectively.

2. The vehicle as defined in claim 1, wherein the van body is provided with a wall in the chamber to divide the chamber into a first sub-chamber and a second sub-chamber and the cold devices put in the first sub-chamber have the eutectic temperatures different from that of the cold devices put in the second sub-chamber.

3. The vehicle as defined in claim 2, wherein the outlet of the refrigerator is on the wall in the first sub-chamber and the eutectic temperatures of the cold devices in the first sub-chamber are greater than that of the cold devices in the second sub-chamber.

4. The vehicle as defined in claim 1, wherein the cold devices have through holes and orientations of the through holes are substantially parallel to paths of the cold airflow.

5. A low-temperature delivery vehicle, comprising:
a van body having a chamber therein;
a refrigerator having an outlet on a wall of the chamber to provide a cold airflow to the chamber, and
a plurality of cold devices, each of which has a eutectic material therein and the eutectic material has an eutectic temperature, in the chamber of the van body at positions of paths of the cold airflow;
wherein the cold devices are cooled to a temperature lower than the eutectic temperatures of the eutectic materials prior to the cold devices are put in the chamber;
wherein the van body is provided with a plurality of mounts on the wall of the chamber, in which the cold devices are received, and the mounts have openings and a door respectively and a rope has an end fastened to the door and an opposite end detachably connecting the cold device received in the mount, so that the cold device is drawn by the rope while the door is opened.

6. The vehicle as defined in claim 5, wherein the rope has a hook to hook the cold device.

7. The vehicle as defined in claim 5, wherein the van body is provided with a wall in the chamber to divide the chamber into a first sub-chamber and a second sub-chamber and the cold devices put in the first sub-chamber have the eutectic temperatures different from that of the cold devices put in the second sub-chamber.

8. The vehicle as defined in claim 7, wherein the outlet of the refrigerator is on the wall in the first sub-chamber and the eutectic temperatures of the cold devices in the first sub-chamber are greater than that of the cold devices in the second sub-chamber.

9. The vehicle as defined in claim 5, wherein the cold devices have through holes and orientations of the through holes are substantially parallel to paths of the cold airflow.

10. A low-temperature delivery vehicle, comprising:
a van body having a chamber therein;
a refrigerator having an outlet on a wall of the chamber to provide a cold airflow to the chamber, and
a plurality of cold devices, each of which has an eutectic material therein and the eutectic material has an eutectic temperature, in the chamber of the van body at positions of paths of the cold airflow;
wherein the cold devices cooled to a temperature lower than the eutectic temperatures of the eutectic materials prior to the cold devices are put in the chamber;

wherein the van body is provided with a plurality of mounts in the chamber, in which the cold devices are received, and the mounts have legs fixed to the wall of the chamber, such that the cold devices received in the mounts keeps a predetermined distance from the wall.

11. The vehicle as defined in claim 10, wherein the van body is provided with a wall in the chamber to divide the chamber into a first sub-chamber and a second sub-chamber and the cold devices put in the first sub-chamber have the eutectic temperatures different from that of the cold devices put in the second sub-chamber.

12. The vehicle as defined in claim 11, wherein the outlet of the refrigerator is on the wall in the first sub-chamber and the eutectic temperatures of the cold devices in the first sub-chamber are greater than that of the cold devices in the second sub-chamber.

13. The vehicle as defined in claim 10, wherein the cold devices have through holes and orientations of the through holes are substantially parallel to paths of the cold airflow.

* * * * *